June 6, 1939.  R. P. PIPEROUX  2,161,588
EXTRUDED ARTICLE AND DEVICE FOR MAKING SAME
Filed March 22, 1935  2 Sheets-Sheet 1
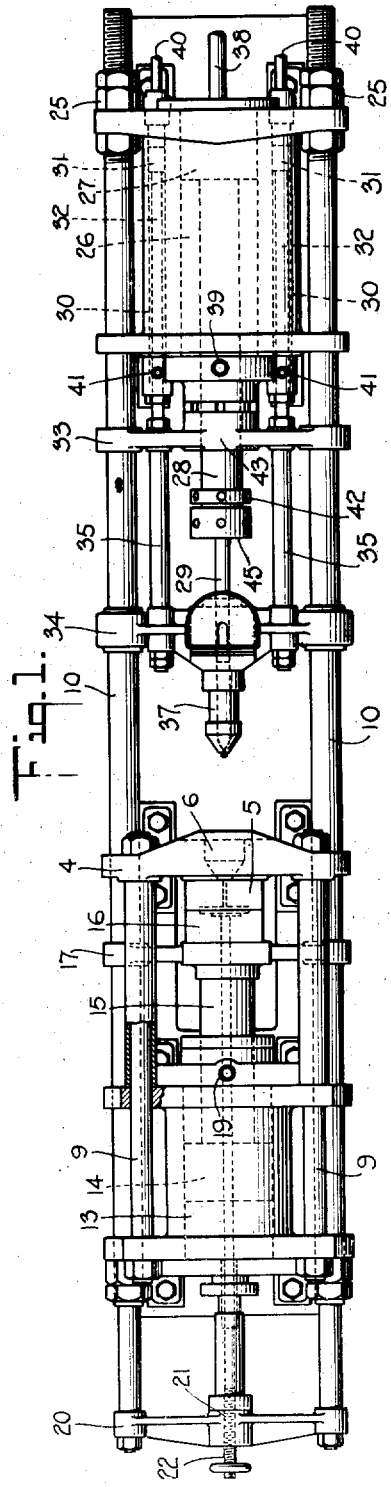
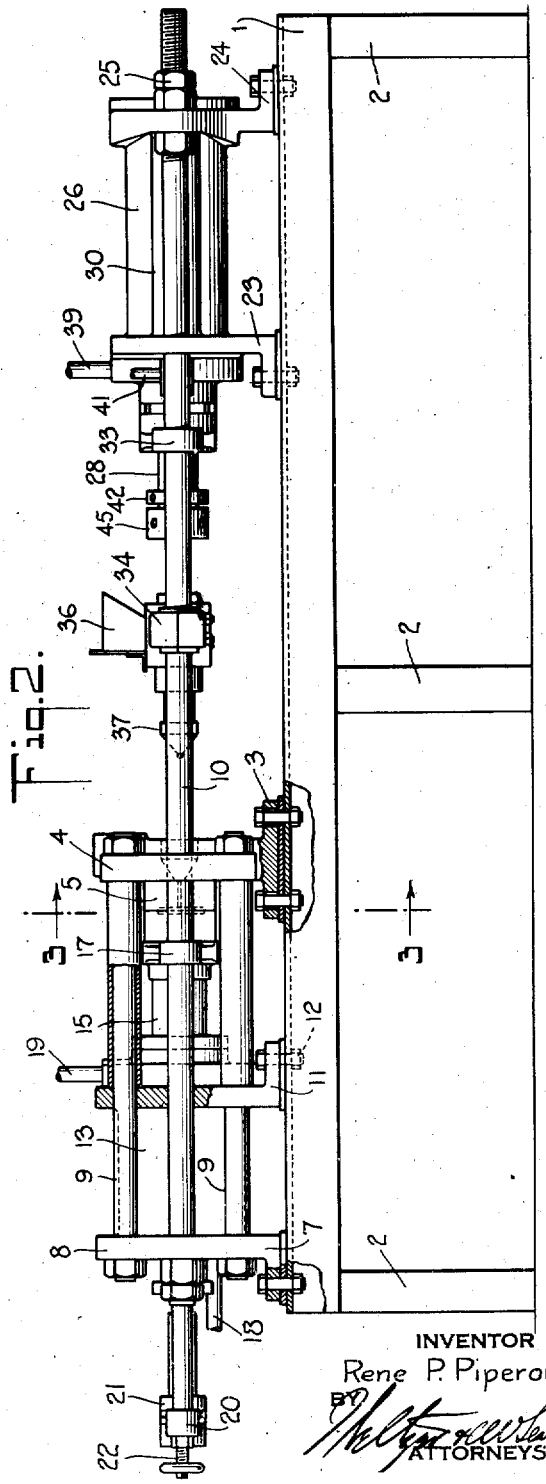
INVENTOR
Rene P. Piperoux
ATTORNEYS

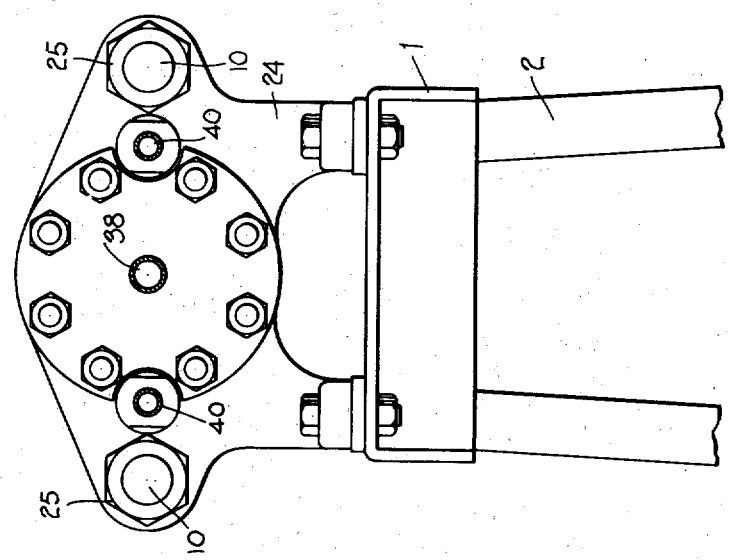
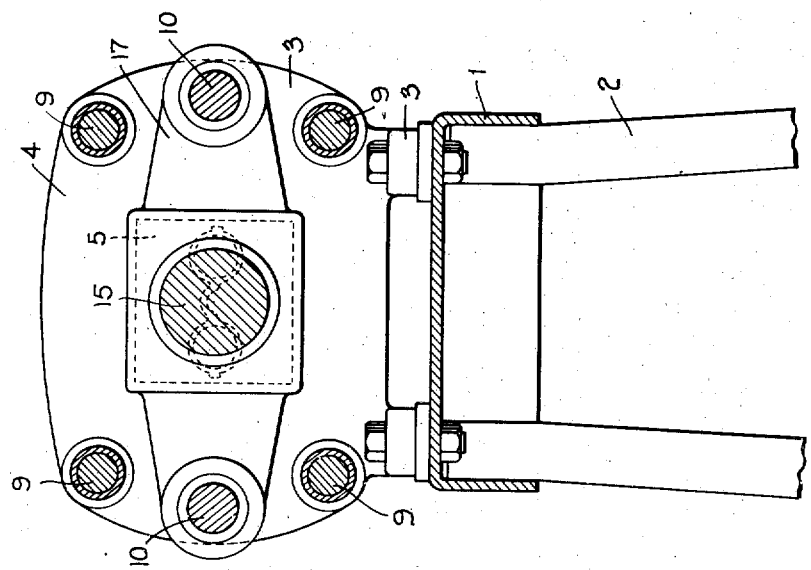

Patented June 6, 1939

2,161,588

UNITED STATES PATENT OFFICE 2,161,588

EXTRUDED ARTICLE AND DEVICE FOR MAKING SAME

Rene P. Piperoux, Radburn, N. J., assignor to Celluloid Corporation, a corporation of New Jersey Application March 22, 1935, Serial No. 12,369

8 Claims. (Cl. 18—30)

This invention relates to extruded articles made from or containing thermoplastic materials or thermosetting material, and to the method and a device for forming same wherein the material extruded into a mold is prevented from spewing.

An object of the invention is the economic and expeditious production of molded articles formed by extrusion methods which, when removed from the mold, have substantially no skirt or fin formed thereon due to the material spewing at the joint of the mold sections. Another object of this invention is the construction of a device for the formation of molded articles by the extrusion method, which device is so constructed that the articles produced are of a true shape and contain no heavy skirt or edge that would require cutting off. The latter necessitates a waste of material and/or grinding smooth to a true shape, making for an added, expensive operation in the production of an article. Other objects of the invention will appear from the following detailed description and drawings.

In the drawings, also forming a part of this invention, wherein like reference numerals refer to the same or similar elements in the various figures Figure 1 is a plan view of a device constructed according to this invention.

Fig. 2 is a side elevation, partly in section of the device shown in Fig. 1.

Fig. 3 is a view in elevation taken on the line 3—3 of Fig. 2.

Fig. 4 is an end view in elevation of the device shown in Fig. 1.

By employing this invention, the waste normally caused by material forcing the mold faces apart, thus spewing and forming a skirt or fin on the object and also forming imperfect articles that must be thrown away or classed as seconds is eliminated by keeping the two halves of the die always in close contact as the plastic material is forced into the mold. This is accomplished by applying a hydraulic or any fluid pressure on the mold tending to hold the mold faces together such that the applied pressure is greater than the pressure used in forcing or extruding the plastic material into the mold.

By employing this invention there may be formed by extrusion methods substantially perfect articles. The closing apparatus of the mold or die faces is so made that when pressure is applied within the mold or die by the injection of the plastic material, opening of the die is resisted by means of hydrulic or any fluid pressure, the halves of the dies being so hooked up that under the tremendous pressure obtained, any lengthening of the die tie rods is immediately compensated by a following up of the die, thus permitting the die to remain closed entirely independent of extension or contraction of the metal parts under load or strain.

In accordance with my invention, I construct an extrusion molding device containing two opposing fluid pressures operating from opposite sides of a moving mold or die face, which mold or die face cooperates with a stationary mold or die face, the opposing fluid pressures being such that, during extrusion, there is a greater pressure operating on the back of the moveable mold or die face tending to hold the two mold faces together than the pressure operating to separate the mold faces. The arrangement and construction of the pressure producing mechanisms are such that a creeping of the various parts is permitted, allowing for expansion, elongation or contraction of the metal in parts under load or strain, without disrupting the applied pressures on the mold.

This invention is applicable to the forming of articles by the extrusion method, which articles are formed from thermoplastic or thermosetting materials containing organic compounds. For instance, this invention is particularly applicable to the formation of articles from thermoplastic resins such as those formed by the condensation of polyhydric alcohols with organic acids in such a manner as to possess the properties of being thermoplastic or weldable by the action of pressure and/or heat and to such resinous-like materials as chlorinated rubber, polymerized vinyl compounds, etc. This invention is also particularly adaptable to the formation of molded articles from thermoplastic materials containing derivatives of cellulose, for instance, cellulose nitrate of any degree of nitration, the organic esters of cellulose and the cellulose ethers. Examples of organic esters of cellulose are cellulose acetate, cellulose formate, cellulose propionate and cellulose butyrate, while examples of cellulose ethers are methyl cellulose, ethyl celluose and benzyl cellulose.

When employing such thermoplastic materials as the derivatives of cellulose, the same may be ground into a fine state of subdivision, in the presence of various effect materials, into a compound known in the art as press mass powder. The effect materials that may thus be combined with the thermoplastic derivatives of cellulose are plasticizers, pigments, fillers, dyes and lakes, etc. Any suitable method and means may be employed for forming the press mass powders, for instance, there may be employed the methods and materials described in U. S. Patents Nos. 1,732,330, 1,871,-670, 1,910,948, 1,942,090, 1,980,326, 1,987,610, 1,930,069, 1,899,542 and 1,899,053.

As a means of visualizing the invention the same will be described with reference to the device shown in the drawings, which device also forms a part of this invention. The device consists of a main frame 1 supported by suitable legs 2. This main frame may be of any suitable construction capable of withstanding the weight and vibration of the device. This main frame is preferably in the form of a table, the edges of the top of the same being formed of angle iron or other suitable material. This table is adapted to support a plurality of pistons and a set of die faces for the purpose of forming articles from plastic materials by the extrusion method of casting.

There may be suitably fastened on to the main frame or table 1 a standard 3 having a yoke member or breast plate 4, which may be formed thereon or joined thereto, a mold face 5 is fastened to the yoke member and has an opening 6 adapted to receive the nozzle of an extrusion device which supplies molding material under pressure to the mold cavity. A suitable standard 7 may also be fastened to the main frame 1, which standard may be provided with yoke member 8 formed integral therewith or joined thereto. The standards 7 and 3 may be provided with four holes adapted to receive tie rods 9 for the purpose of maintaining and bracing the standards and devices carried thereby. The standards 3 and 7 may also contain holes through which are threaded main tie rods 10, one main tie rod being on each side of the device.

There may be provided on the table 1 a standard 11, which standard may be slidably connected thereto as by means of a lug bolt 12 operating in a groove or slot in the top of the table. This standard 11 and the standard 7 support a cylinder 13 which cylinder may contain a piston 14 adapted to drive a piston rod 15 attached to a die face 16. The die face 16 and the outer end of piston rod 15 may be supported by yoke 17 adapted to slide upon the main tie rods 10 of the device. For operating the piston there may be provided a source of fluid pressure 18 adapted to exert pressure behind the piston to move the same and the die face 16 forward to contact with the die face 5. A suitable source of fluid pressure 19 is provided for forcing the piston inwardly, thus separating the die faces 16 and 5. For the purpose of automatically ejecting formed pieces from between the mold faces 5 and 16, there is provided a yoke 20 carrying within it a long threaded member 22, going through a packed joint in the cylinder 13, through the piston rod 15, and yoke 17, and extending into the die block 16 and bearing against a standard type of knockout plate. The purpose of threading member 22 is to permit of making an adjustment in its length relative to the die block 16 so that when the die block 16 retracts it will just strike the end of the member 22.

There may be suitably mounted on the main frame 1 suitably spaced standards 23 and 24 adjustably secured to the main frame 1. These standards 23 and 24 contain holes therein through which the main tie rods 10 are passed. The position of the standards 23 and 24 may be regulated with respect to the remaining parts of the device and held in adjusted position by means of lock nuts 25 on the main tie rods 10 as well as by being fastened to the table top through the feet of the standards 23 and 24. There may be positioned between the standards 23 and 24 a main cylinder 26 having operating therein a piston 27 carrying a piston rod 28. The piston rod 28 may terminate in a plunger 29 operating in the feed hopper of the device. Also carried by the standards 23 and 24 are two similar cylinders 30 which may be positioned one on each side of and in the horizontal plane passing through the center of the main cylinder 26. Each of the cylinders 30 is provided with a piston 31 connected by a piston rod 32 to a yoke member 33 that is adapted to ride on and slide along the main tie rods 10. Yoke member 33 may be connected with a similar yoke member 34, also adapted to ride on main tie rods 10, by means of connecting rods 35, which connecting rods may be an extension of the piston rods 32 or other suitable rods. The yokes 33 and 34 with their connecting rods 35 form a carriage adapted to be moved back and forth along the main tie rods 10. The carriage thus formed may be provided with a hopper 36 connected to a nozzle 37. The material to be molded, for instance, press mass powder, may be fed to the hopper 36 which in turn feeds the material to the nozzle 37 that is adapted to register with the receiving opening 6 in the mold face 5. Both the nozzle 37 and the hopper 36 may be provided with heating or cooling elements, thermostatically controlled if desired. For instance, these elements may be connected to a system for circulating fluids through jackets formed thereon or the same may be connected to a suitable source of electric current that may operate inductance or resistance coils to melt the material just prior to being extruded into the cavity of the mold formed between the mold faces 5 and 16.

A suitable source of fluid pressure 38 may be provided for forcing the piston 27 forward, thus moving the plunger 29 in such a manner as to force the material out of the nozzle 37. A suitable source of fluid pressure 39 may be provided for withdrawing piston 27, thus pulling the plunger 29 out from the nozzle 37 and permitting a further charge of material to run or fall down into the nozzle 37 ready for extrusion on a subsequent stroke. Suitable ducts 40 may be provided for applying fluid pressure to the pistons 31 for the purpose of moving the carriage and the nozzle 37 forward into registry with the opening 6 of the die mold. Suitable ducts 41 may be provided for applying fluid pressure to pistons 31 in such a manner as to pull the carriage back from the mold face opening 6.

It will be further noted that the piston rod 28 terminates in a collar 45 having an adjustable section 42 that may be screwed into or out of the collar 45. The section 42 is adapted, on the back stroke of the piston 27, to contact with a shoulder 43 on the yoke 33 to pull the carriage back. There is sufficient play left between the section 42 and shoulder 43 in order that the carriage may be moved a short distance forward and back with reference to the plunger 29 to pump or completely fill the nozzle.

In operation, fluid pressure is admitted through duct 18, forcing the piston 15 forward and closing the die faces 5 and 16. The hopper 36 having been filled with a suitable thermoplastic material, fluid pressure is applied to the pistons 31—31 through the ducts 41. As has been previously stated, there is a lost or slack motion between the yoke 33 and the piston rod 28 which enables the hopper and nozzle 36 and 37 to be drawn back against the cylinder 27 to such an extent as may be limited by this slack motion. This permits the packing of the thermoplastic material within this nozzle 37. This is repeated as many times as may be necessary by successive admission and release of the pressure through ducts 41, each time taking a small charge of powder and thoroughly packing within the nozzle, without, however, exerting enough force thereon to extrude it through the nozzle 37. When the powder has been suitably packed, pressure is cut off through ports 41 and admitted behind piston 31 by ducts 40, pushing the hopper forward again to the forward limit of its motion on plunger 38, leaving the piston rod 29 retracted within the nozzle 37.

Pressure is now admitted through port 38 and since pressure still exists on the back of the piston 31, the whole assembly will go forward together until such time as the nozzle 37 enters the opening 6 in the mold face and is positioned against the mold, at which time further motion of the nozzle 37 is stopped, it being held firmly on the mold face by the pressure behind piston 31. However, pressure still being exerted behind piston 29 (via port 38) the piston 29 will continue to go forward within the nozzle 37, forcing the material into the mold. It will be noted that pistons 31 are relatively small, so that the pressure exerted by the nozzle 37 against the die face is limited to such an extent as to reduce to a safe value the unit pressure on nozzle 37 which would otherwise be crushed. However, the pressure admitted behind piston 29, because of its large area, is relatively great—permitting high pressures within the mold without subjecting the nozzle tip to undue strain.

It will be noted that the area of the piston 13 is considerably larger than the area of the piston 27. This arrangement provides for the non-opening of the mold faces during extrusion of material into the mold. Thus, the projected area of the piece being extruded in a line at right angles to the axis of the machine, multiplied by the pressure per sq. in. existing within the nozzle (and therefore within the mold) will be no greater than the unit pressure per sq. in. within the cylinder 13, multiplied by the area of the piston 14. Since some pressure within the nozzle 37 is lost going through the ports of the mold, the above conditions will be obtained only when the material is exceedingly fluid—in which case fluid pressures and their laws will govern. Actually, it is my experience that the unit pressure per sq. in. existing within the mold during usual extruding conditions is only about ⅔ the pressure per sq. in. existing within the nozzle. This is, of course, approximate. More fluid material will give greater pressures and less fluid material, lower pressures.

By employing this device, the mold faces 16 and 5 are held in close position by means of the fluid pressure in the cylinder 13, which cylinder 13 is attached to the main tie rods 10 of the device, so that when the machine is in operation any elongation of the metallic parts, such as tie rods 10, plunger 29, etc., is compensated by the maintenance of a constant pressure on the die or mold face 16. Thus, any creeping of the cylinders due to the elongation of the tie rods is fully compensated by the movement of the piston 14 and the cylinder 13, so that there is always maintained on the die face 16 pressure which is inadequate to prevent the separation of the mold sections.

It is to be understood that the foregoing detailed description and drawings are given merely by way of illustration and that many variations may be made therein without departing from the spirit of my invention.

Having described my invention, what I desire to secure by Letters Patent is:

1. An extrusion molding device for molding organic thermoplastic substances, comprising a hopper for holding a supply of material, a nozzle connected to said hopper, a sectional mold adapted to receive the material from said nozzle, a plunger in said nozzle, fluid pressure means for operating said plunger, a second fluid pressure means operatively connected to a section of the mold remote from said nozzle and adapted to hold the sections of the mold together, means binding the two fluid pressure means together and fluid pressure means for registering said nozzle with, and holding said nozzle against, said mold, under a pressure which is less than the pressure employed for holding the mold sections together.

2. An extrusion molding device for molding organic thermoplastic substances comprising a hopper for holding a supply of material, a nozzle connected to said hopper, a sectional mold adapted to receive the material from said nozzle, a plunger in said nozzle, a fluid pressure cylinder, a piston in said cylinder operatively connected to said plunger, a second fluid pressure means operatively connected to a section of the mold remote from said nozzle and adapted to hold the sections of the mold together, means binding the two fluid pressure means together and fluid pressure means for moving said hopper and said nozzle to, and holding said nozzle against, said mold, under a pressure which is less than the pressure employed for holding the mold sections together.

3. An extrusion molding device for molding organic thermoplastic substances comprising a hopper for holding a supply of material, a nozzle connected to said hopper, a sectional mold adapted to receive the material from said nozzle, a plunger in said nozzle, a fluid pressure cylinder, a piston in said cylinder operatively connected to said plunger, means for supplying operating fluid to either side of said piston, a second fluid pressure means operatively connected to a section of the mold remote from said nozzle and adapted to hold the sections of the mold together, means binding the two fluid pressure means together and fluid pressure means for moving said hopper and said nozzle to, and holding said nozzle against, said mold, under a pressure which is less than the pressure employed for holding the mold sections together.

4. An extrusion molding device for molding organic thermoplastic substances comprising a hopper for holding a supply of material, a nozzle connected to said hopper, a sectional mold adapted to receive the material from said nozzle, a plunger in said nozzle, a fluid pressure cylinder, a piston in said cylinder operatively connected to said plunger, a second fluid pressure cylinder, a second piston in said cylinder operatively connected to a section of said mold remote from said nozzle, means binding the two fluid pressure means together and fluid pressure means for moving said hopper and said nozzle to, and holding said nozzle against, said mold, under a pressure which is less than the pressure employed for holding the mold sections together.

5. An extrusion molding device for molding organic thermoplastic substances comprising a hopper for holding a supply of material, a nozzle connected to said hopper, a sectional mold adapted to receive the material from said nozzle, a plunger in said nozzle, fluid pressure means for operating said plunger, a fluid pressure cylinder, a carriage for supporting said hopper and nozzle, a piston in said cylinder operatively connected to said carriage for moving the said hopper and nozzle, to move and to hold said nozzle against, said mold, under a pressure which is less than the pressure employed for holding the mold sections together, a second fluid pressure means operatively connected to a section of the mold remote from said nozzle and adapted to hold the sections of the mold together and means binding the two fluid pressure means together.

6. An extrusion molding device for molding organic thermoplastic substances comprising a hopper for holding a supply of material, a nozzle connected to said hopper, a sectional mold adapted to receive the material from said nozzle, a plunger in said nozzle, fluid pressure means for operating said plunger, a plurality of fluid pressure cylinders, a carriage supporting said hopper and nozzle, pistons in said cylinders operatively connected to said carriage for moving the said hopper and nozzle, to move and to hold said nozzle against, said mold, under a pressure which is less than the pressure employed for holding the mold sections together, a second fluid pressure means operatively connected to a section of the mold remote from said nozzle and adapted to hold the sections of the mold together and means binding the two fluid pressure means together.

7. An extrusion molding device for molding organic thermoplastic substances comprising a hopper for holding a supply of material, a nozzle connected to said hopper, a sectional mold adapted to receive the material from said nozzle, a plunger in said nozzle, a fluid pressure cylinder, a piston in said cylinder operatively connected to said plunger, means for supplying operating fluid to either side of said piston, a pair of fluid pressure cylinders, a carriage supporting said hopper and nozzle, pistons in said pair of cylinders operatively connected to said carriage for moving the said hopper and nozzle, to move and to hold said nozzle against, said mold, under a pressure which is less than the pressure employed for holding the mold sections together, a second fluid pressure cylinder, a piston in said cylinder operatively connected to a section of said mold remote from said nozzle for holding the mold together, means for supplying operating fluid to either side of said piston and means binding the two fluid pressure means together.

8. An extrusion molding device for molding organic thermoplastic substances, comprising a hopper for holding a supply of material, a nozzle connected to said hopper, a sectional mold adapted to receive the material from said nozzle, a plunger in said nozzle, fluid pressure means for operating said plunger, fluid pressure means for moving and holding the mold sections together and for bringing and holding the mold and nozzle into registry and contact with each other, said last named means including means for exerting a greater pressure upon the mold sections for holding them together than is exerted upon the nozzle for holding the latter in contact with the mold.

RENE P. PIPEROUX.

CERTIFICATE OF CORRECTION.

Patent No. 2,161,588.   June 6, 1939.

RENE P. PIPEROUX.

It is hereby certified that error appears in the printed specification of the above numbered patent requiring correction as follows: Page 1, first column, line 54, for "hydrulic" read hydraulic; page 3, second column, line 1, for "inadequate" read adequate; and that the said Letters Patent should be read with this correction therein that the same may conform to the record of the case in the Patent Office.

Signed and sealed this 18th day of July, A. D. 1939.

(Seal)

Henry Van Arsdale,
Acting Commissioner of Patents.